US012642179B2

(12) United States Patent
Melancon

(10) Patent No.: US 12,642,179 B2
(45) Date of Patent: Jun. 2, 2026

(54) COMBINATION COLLECTION AND BAGGING DISPOSAL SYSTEM

(71) Applicant: Brian Jacob Melancon, Montgomery, TX (US)

(72) Inventor: Brian Jacob Melancon, Montgomery, TX (US)

( * ) Notice: Subject to any disclaimer, the term of this patent is extended or adjusted under 35 U.S.C. 154(b) by 697 days.

(21) Appl. No.: 17/964,007

(22) Filed: Oct. 11, 2022

(65) Prior Publication Data

US 2024/0114833 A1     Apr. 11, 2024

Related U.S. Application Data

(60) Provisional application No. 63/254,525, filed on Oct. 11, 2021.

(51) Int. Cl.
A01D 43/063     (2006.01)
A01D 34/71     (2006.01)

(52) U.S. Cl.
CPC ......... A01D 43/0636 (2013.01); A01D 34/71 (2013.01); A01D 43/0631 (2013.01); A01D 43/0635 (2013.01)

(58) Field of Classification Search
CPC ............ A01D 43/0636; A01D 43/0631; A01D 43/0635; A01D 43/063
See application file for complete search history.

(56) References Cited

U.S. PATENT DOCUMENTS

| | | | | |
|---|---|---|---|---|
| 4,550,553 | A | * | 11/1985 | Gaither ................ A01D 43/063 56/16.6 |
| 5,673,544 | A | * | 10/1997 | Voigt ................. A01D 43/0636 56/320.2 |
| 6,574,829 | B1 | * | 6/2003 | Marcum ................... A47L 5/14 55/374 |
| 9,084,393 | B1 | * | 7/2015 | Singleton ........... A01D 43/0636 |
| 10,667,465 | B1 | * | 6/2020 | Lauer ..................... A01G 20/47 |
| 2008/0264029 | A1 | * | 10/2008 | Sepaniak ............. A01D 43/063 56/202 |
| 2019/0327895 | A1 | * | 10/2019 | Walden ................ A01D 43/077 |

* cited by examiner

*Primary Examiner* — Alicia Torres
*Assistant Examiner* — Jose Antonio Martinez
(74) *Attorney, Agent, or Firm* — Curtis W. Lockhart; Lockhart IP

(57) ABSTRACT

A combination collection and bagging disposal system is provided. The system includes an intake hose configured to connect to a lawn mower via a lawn mower output adapter. The intake hose connects to a collection housing unit configured to temporarily store debris. The collection housing unit may include an airflow screen to facilitate airflow through the system while keeping the debris trapped in the collection housing unit. A flexible debris collection tube is connected to the collection housing unit and expands as debris is collected. Once a desired capacity is reached, the flexible debris collection tube is cut and sealed for disposal.

11 Claims, 12 Drawing Sheets

COMBINATION COLLECTION AND BAGGING DISPOSAL SYSTEM

COPYRIGHT AND TRADE DRESS NOTICE

A portion of the disclosure of this patent document contains material which is subject to copyright or trade dress protection. This patent document may show and/or describe matter that is or may become trade dress of the owner. The copyright and trade dress owner has no objection to the facsimile reproduction by anyone of the patent disclosure, as it appears in the Patent and Trademark Office patent files or records, but otherwise reserves all copyright and trade dress rights whatsoever.

BACKGROUND

1. Field of the Invention

The present invention relates generally to debris disposal devices, and more specifically, to a combination collection and bagging disposal system for facilitating collection and disposal of debris.

2. Description of Related Art

This background information is intended to further educate the reader as to additional aspects of the prior art and may present examples of specific aspects of the prior art that is not to be construed as limiting the disclosure of the present application.

Debris disposal is a common everyday activity and various apparatuses, and methods are known to facilitate this task. For example, Landscape maintenance is desirable for homeowners and landscapers to achieve a healthy and attractive landscape for a home or public environment and often requires removal of leaves and/or grass clippings. One aspect of landscape maintenance involves cutting grass regularly which is generally accomplished through the assistance of a lawn mower.

Various types of lawn mowers are well known in the art and are an effective means for assisting a user in grounds maintenance. For example, a common lawn mower design is a self-propelled push mower that allows a user to walk behind the mower while the mower is in operation. A push mower generally has a plurality of wheels and a blade on an underside that cuts grass as the mower is moved over a lawn by the user. Another common lawn mower design is a riding mower that allows a user to ride on the mower while the mower is in operation. A riding mower generally has a plurality of wheels, a seat, a steering wheel, and a blade on an underside that cuts grass as the mower moves over a lawn. The user of a riding mower sits in the seat and steers the mower with the steering wheel.

As a lawn mower cuts grass the grass clippings are left behind. The volume of clippings may vary depending on the size of the lawn and the frequency of cutting. Typical lawn mower designs employ a form of bag collecting as a way of collecting and disposing of the grass clippings. For example, a typical push mower includes a breathable lawn bag that collects the grass clippings while the user cuts the grass. Once the lawn bag is filled to capacity, the user removes the lawn bag from the mower and empties the grass clippings into a yard waste receptacle. One problem with this method is the time and effort it takes to dispose of the grass clippings. For example, if the user is mowing a particularly large lawn or a lawn with particularly long grass, the number of times the user would need to remove and empty the lawn bag could significantly increase the time and effort required to cut the entire lawn. Consequently, this can increase the cost of landscape maintenance considerably.

Accordingly, although great advances have been made in the area of debris disposal devices, there are deficiencies that remain.

SUMMARY

The disclosure of the present application addresses the above stated deficiencies with landscape maintenance devices. The combination collection and bagging disposal system of the present application is unique when compared with other known debris disposal devices because it allows for a user to simultaneously collect and bag debris for more efficient disposal.

In one embodiment, the system of the present application may include an intake hose configured to connect to an output portion of a lawn mower, a collector housing having an upper portion configured to allow for airflow and a lower portion configured to secure a flexible debris collection tube and a debris collection tube support member.

The system of the present application is unique in that it integrates the collection and bagging of debris into a single step to reduce the time and effort required for disposal of debris. In one embodiment, the system may be retrofitted to various types of conventional lawn mower designs. The grass clippings output by a lawn mower flow through the intake hose into the collector housing and are sealed in the flexible debris collection tube. The flexible debris collection tube is adjustable in length according to the user's preference. The flexible debris collection tube is secured to an inner portion of the collector housing via one or more latches. When the one or more latches are released, the flexible debris collection tube may be extended in length to increase capacity to receive additional landscape debris. Once the flexible debris collection tube has reached a desired length and has filled with landscape debris to capacity, the user can remove a portion of the tube and tie off the remaining tube to continue collecting additional landscape debris without the need to remove and empty the entire lawn mower bagging system.

BRIEF DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
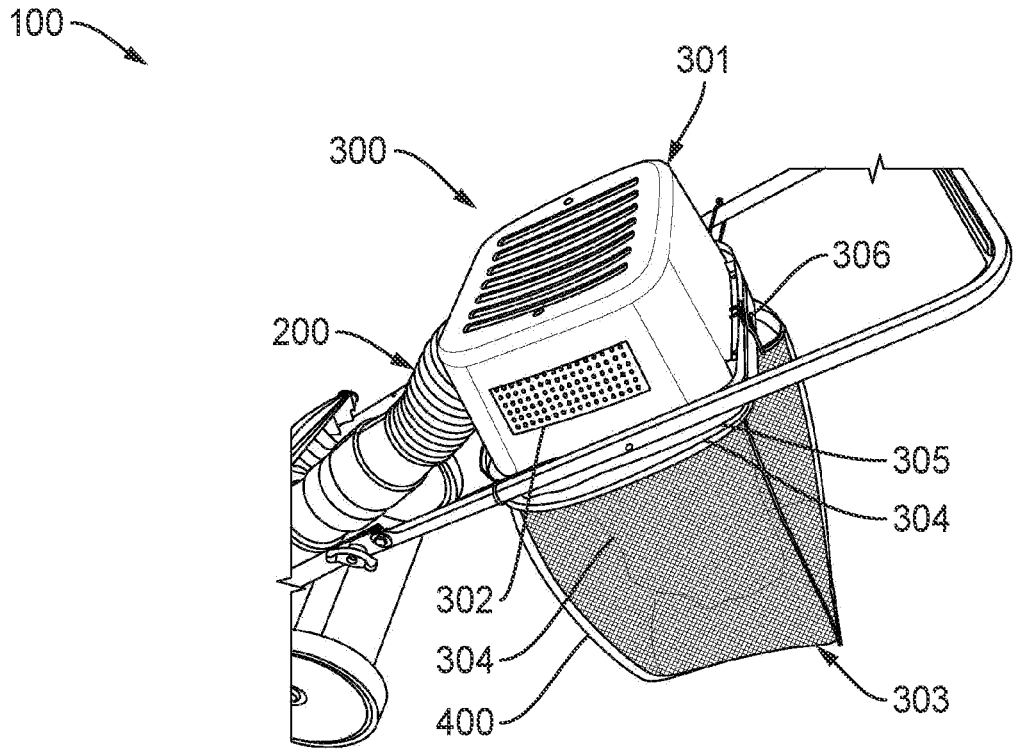
FIG. 1 is a side view illustrating a combination collection and bagging disposal system for use with a push lawn mower in accordance with an embodiment of the present application.
Figure 2:
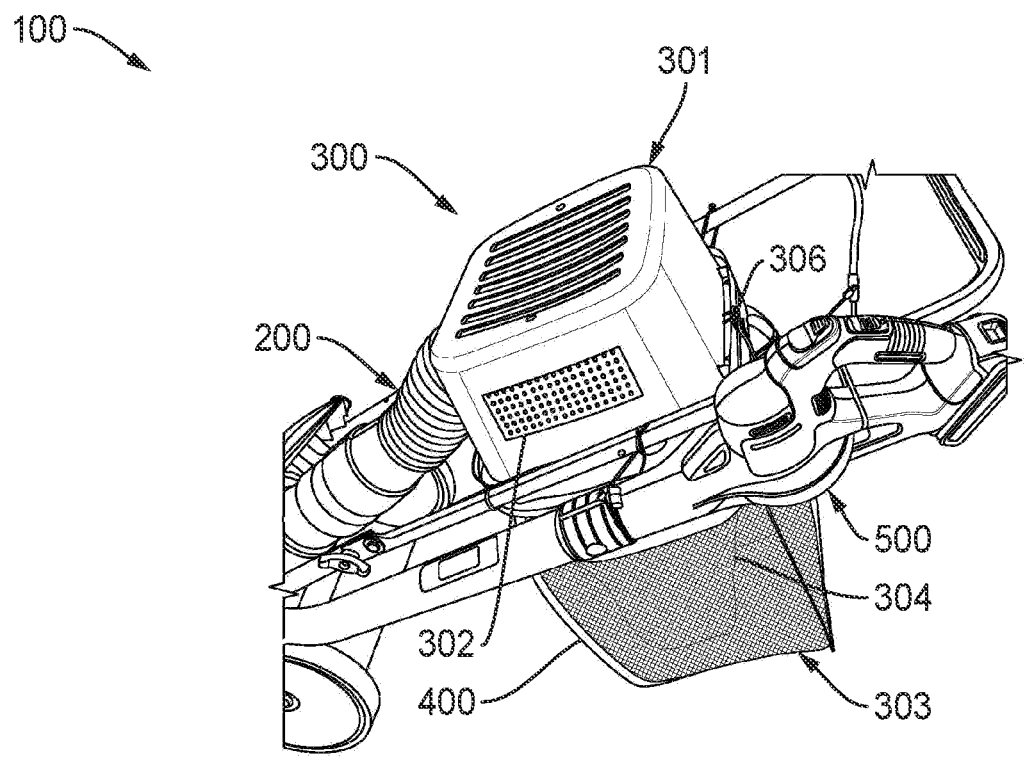
FIG. 2 is a side view illustrating the combination collection and bagging disposal system of FIG. 1 including an air amplifier.
Figure 3:
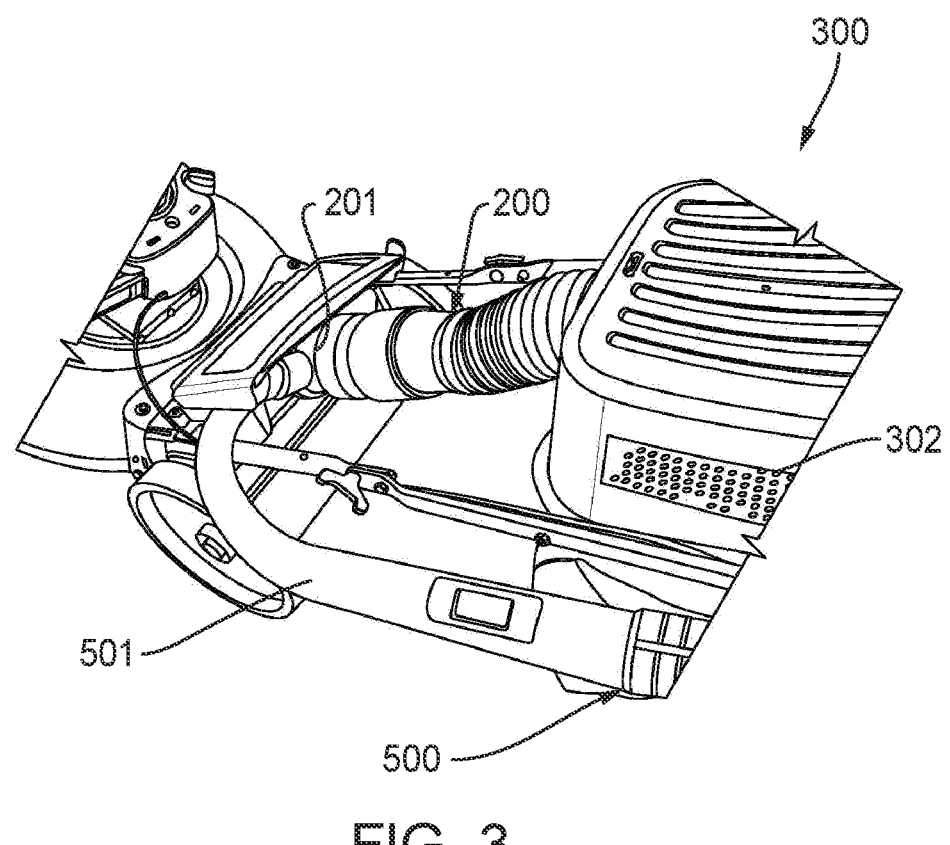
FIG. 3 is a top perspective view illustrating the combination collection and bagging disposal system of FIG. 2.
Figure 4:
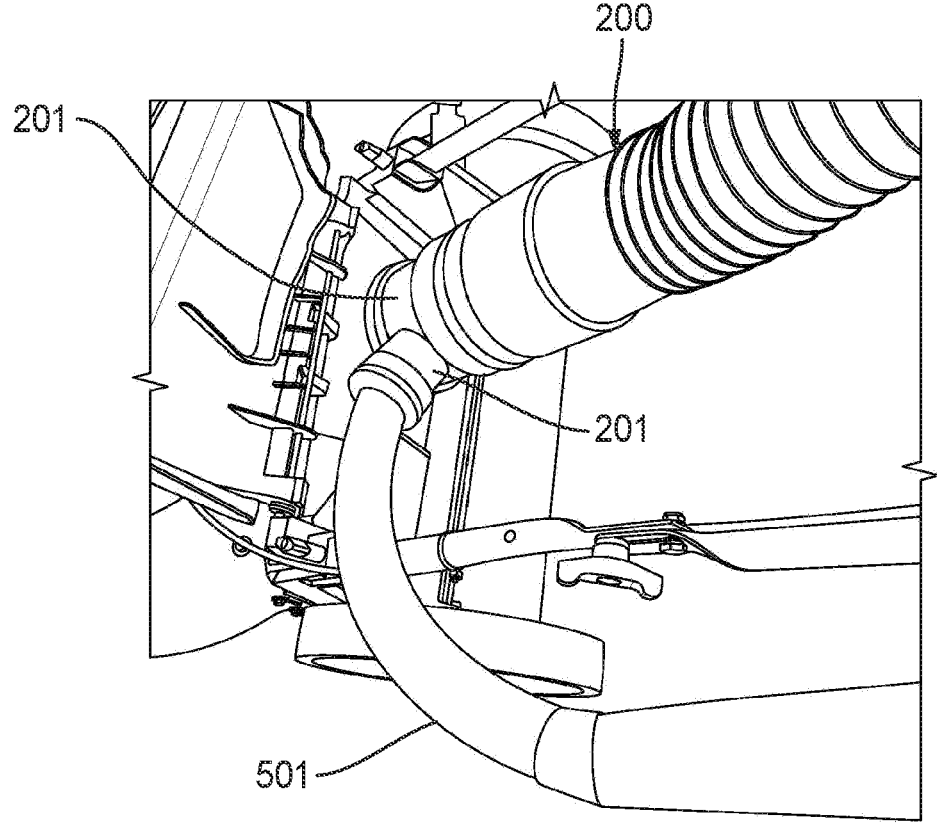
FIG. 4 is a top view illustrating the combination collection and bagging disposal system of FIG. 2.
Figure 5:
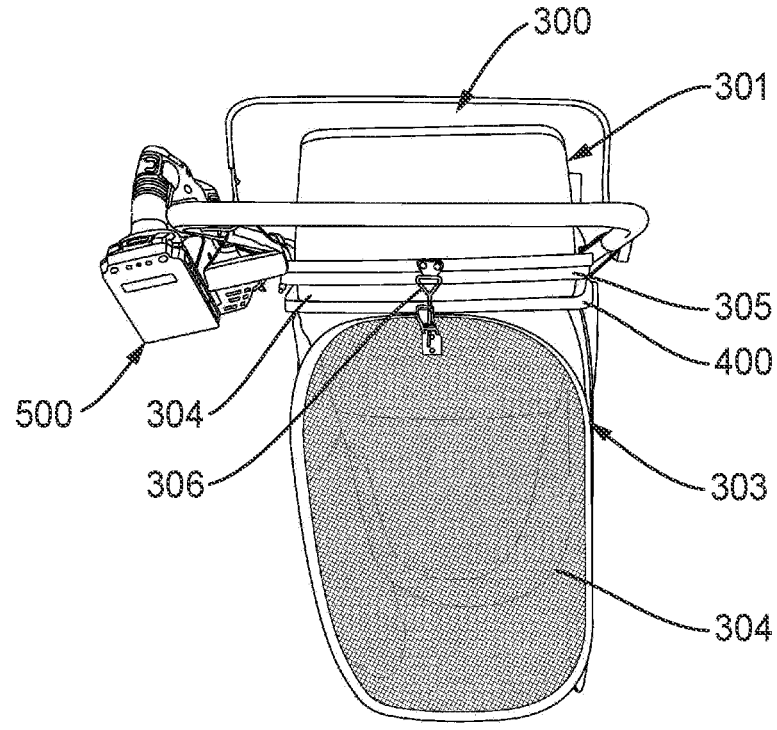
FIG. 5 is a rear view illustrating the combination collection and bagging disposal system of FIG. 2.
Figure 6:
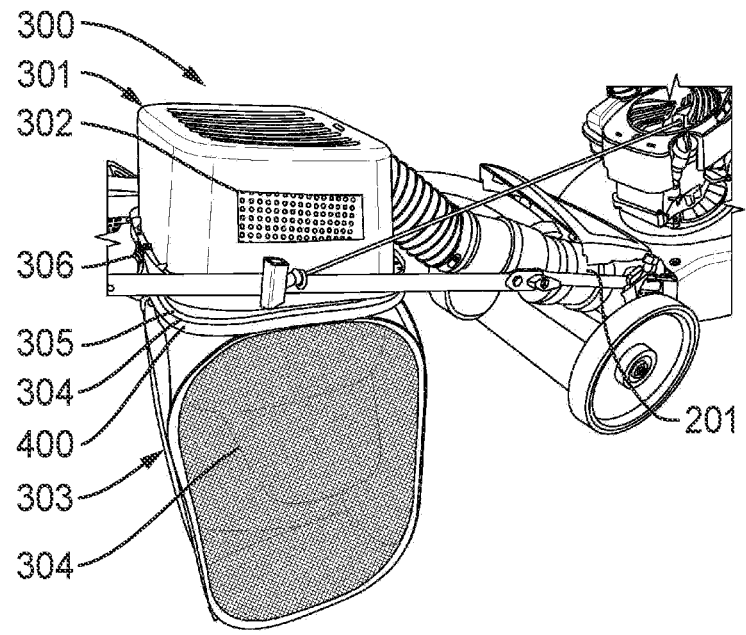
FIG. 6 is a side perspective view illustrating the combination collection and bagging disposal system of FIG. 2.
Figure 7:
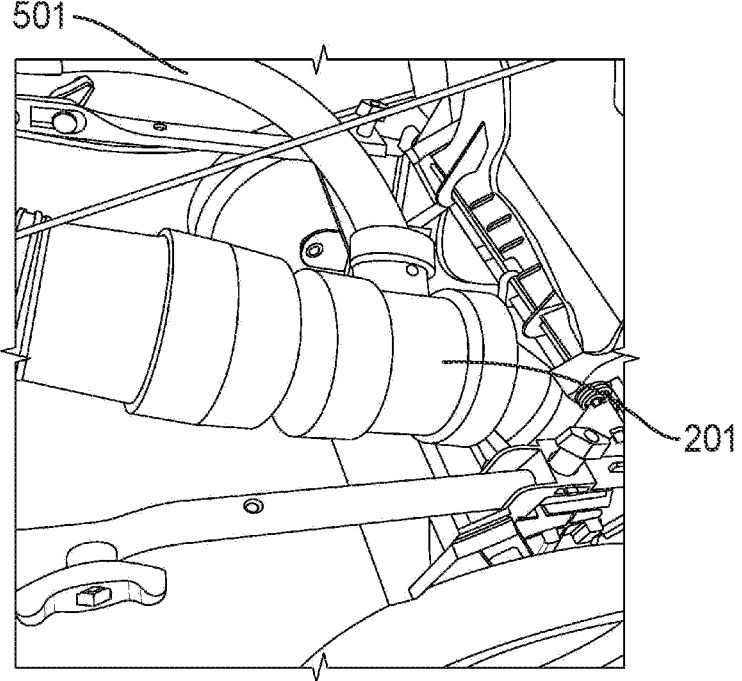
FIG. 7 is a top perspective view illustrating the combination collection and bagging disposal system of FIG. 2.
Figure 8:
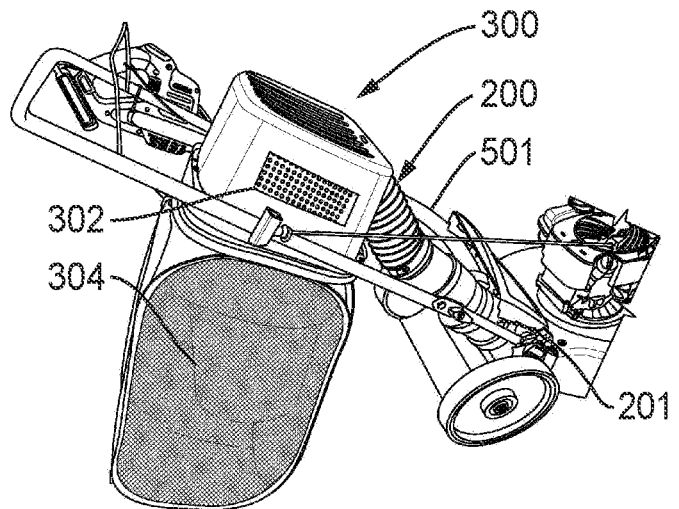
FIG. 8 is a side view illustrating the combination collection and bagging disposal system of FIG. 2.
Figure 9:
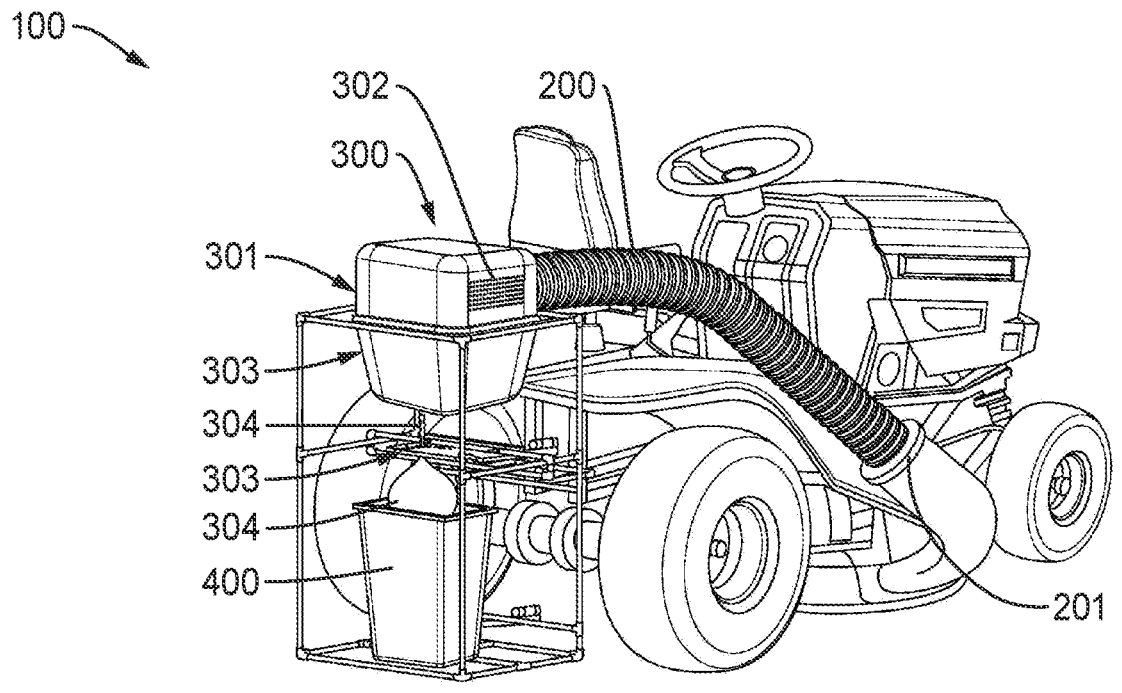
FIG. 9 is a rear side perspective view illustrating a combination collection and bagging disposal system for use with a riding lawn mower in accordance with an embodiment of the present application.
Figure 10:
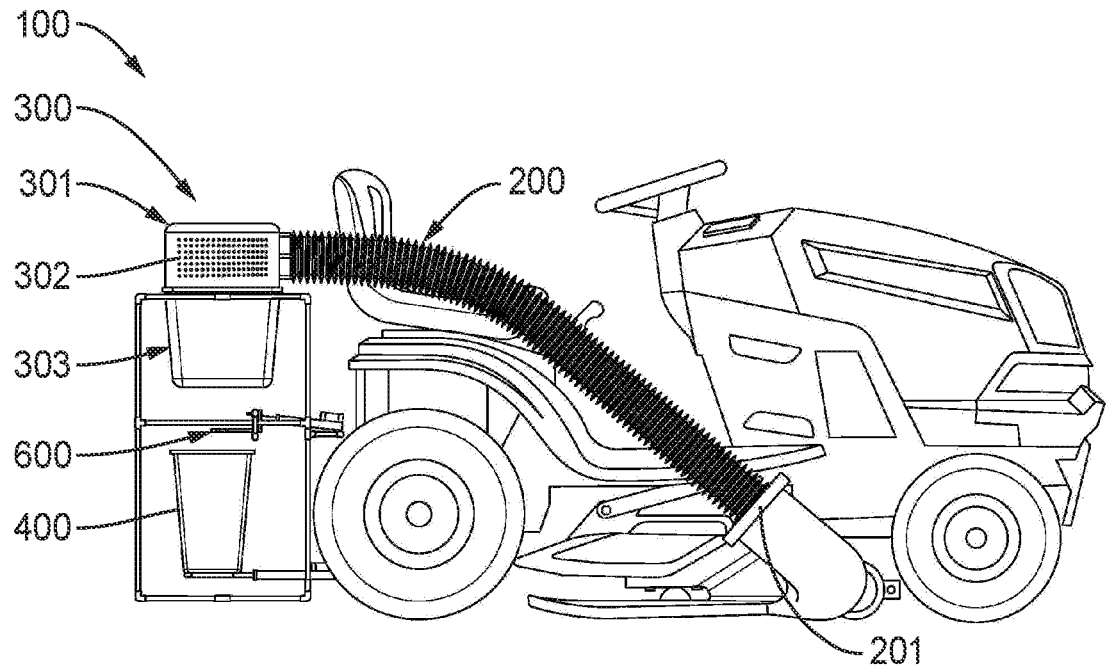
FIG. 10 is a side view illustrating the combination collection and bagging disposal system of FIG. 9.
Figure 11:
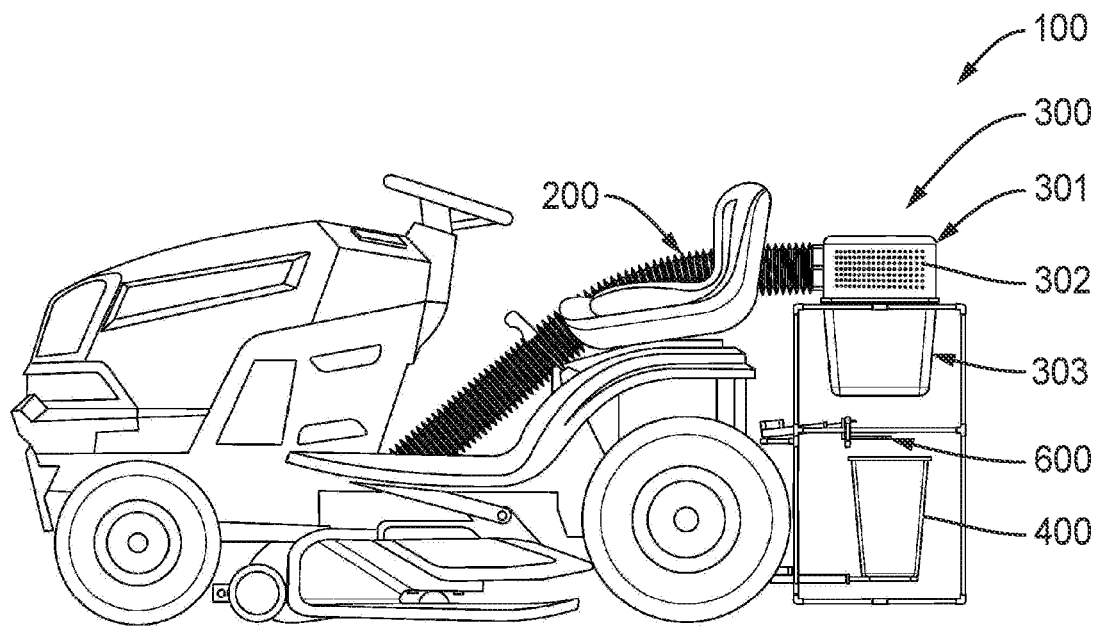
FIG. 11 is a side view illustrating the combination collection and bagging disposal system of FIG. 9.
Figure 12:
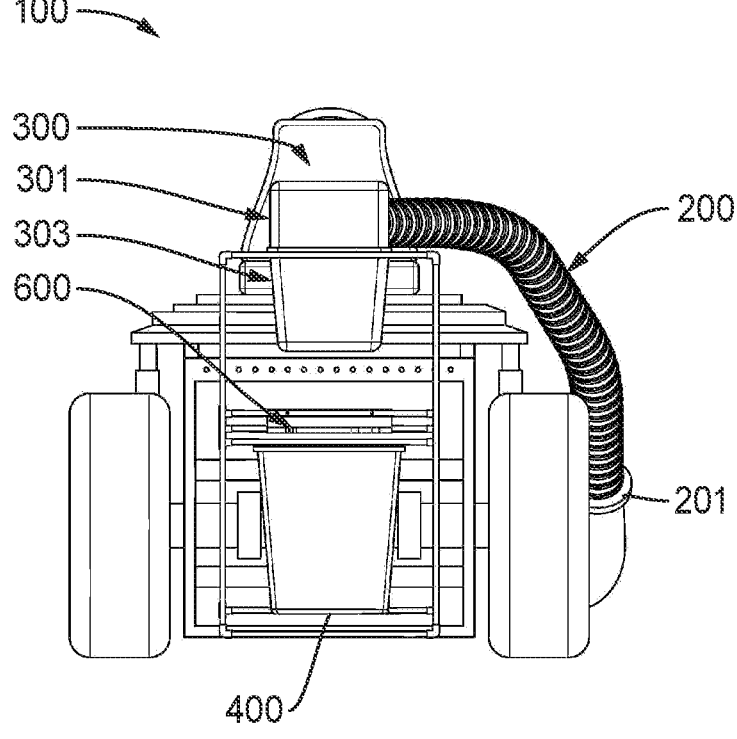
FIG. 12 is a rear view illustrating the combination collection and bagging disposal system of FIG. 9.

While the system of the present application is subject to various modifications and alternative forms, specific embodiments have been shown by way of example in the drawings and are described in detail. It should be understood that the description of specific embodiments is not intended to limit the invention to the particular embodiment disclosed, but rather to cover all modifications, equivalents, and alternatives falling within the scope of the present application as defined by the appended claims.

DETAILED DESCRIPTION

Illustrative embodiments of the system of the present application are provided herein. It should be appreciated that in the development of any actual embodiment, various implementation-specific decisions are required to achieve the developer's specific goals, such as compliance with system-related and business-related constraints, which vary from one implementation to another. Moreover, it should be appreciated that such a development effort might be complex and time-consuming but would nevertheless be a routine undertaking for those of ordinary skill in the art having the benefit of this disclosure.

The system in accordance with the present application overcomes one or more of the above-discussed shortcomings commonly associated with conventional debris disposal devices. Specifically, the combination collection and bagging disposal system incorporates a means for allowing a user to simultaneously collect and bag debris for disposal. These and other unique features of the system are discussed below and illustrated in the accompanying drawings.

The system should be understood, both as to its structure and operation, from the accompanying drawings, taken in conjunction with the accompanying description. Various embodiments of the system may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Referring now to the drawings wherein like reference characters identify corresponding or similar elements throughout the various views, FIG. 1 depicts a side view of a combination collection and bagging disposal system 100 for use with a lawn mower in accordance with an embodiment of the present application. System 100 allows a user to simultaneously collect and bag landscape debris for more efficient disposal. System 100 includes an intake hose 200 configured to connect to a conventional lawn mower via a lawn mower output adapter 201. When in operation, grass clippings output from a lawn mower flow through the intake hose 200 into a collector housing unit 300. The collector housing unit 300 has an upper portion 301 and a lower portion 303. The upper portion 301 is configured to allow for airflow and may include an airflow screen 302 such that air may flow through the collector housing unit 300 but landscape debris remains trapped inside. A flexible debris collection tube 304 is attached to the lower portion 303 and secured in place via an inner debris collection tube support member 305 and an outer debris collection tube support member 400. The inner debris collection tube support member 305 may be bottomless allowing debris to pass through and be deposited into the debris collection tube 304. A latch and/or elastic support 306 further secures the debris collection tube 304 by compressing the inner debris collection tube support member 305 and the outer debris collection tube support member 400 together thereby compressing the debris collection tube 304 in between. When the latch and/or elastic support 306 is released, the user is able to extend the debris collection tube 304 to a desired length.

FIGS. 1-8 show views of the system 100 as it may be adapted in an embodiment for use with a conventional push mower. System 100 may be secured to the mower and used in place of a traditional lawn mower bag device for collecting and disposing of grass clippings.

It should be appreciated that one aspect considered unique to system 100 is the ability to adjust the length and capacity of the debris collection tube 304 such that the user can bag landscape debris according to the user's needs or preferences. The user allows the debris collection tube 304 to fill to a desired capacity and then the tube 304 is cut and tied or secured for immediate disposal. The remaining portion of the debris collection tube 304 is tied or secured for continued collecting of landscape debris. The cutting and tying/securing of the tube 304 process may be done manually by the user or automatically by system 100 itself based on one or more predetermined criteria. This process of cutting and tying/securing of the tube 304 may allow the user to continuously collect and bag landscape debris for disposal without the need to interrupt operation of the lawn mower periodically. The debris collection tube 304 may be made from a plastic material or other suitable material and may be biodegradable to further facilitate disposal of landscape debris and reduce waste material.

It should be appreciated that system 100 may be configured to be used with a variety of types of lawn mowers including self-propelled push mowers and riding mowers. This allows the user to replace the current collecting/bagging system of a mower for the more efficient and effective collection and bagging system of the present application.

FIGS. 9-12 show views of the system 100 as it may be adapted in an embodiment for use with a riding mower. System 100 may be secured to the mower itself or towed behind the mower.

System 100 may further include an air amplifier 500 configured to increase the airflow to the system. Air amplifier 500 connects to the system via an air amplifier intake 501 that connects to the intake hose 200 of system 100. The additional air provided by the air amplifier 500 facilitates the flow of debris through system 100 and reduces clogging in system 100 during use.

System 100 may further include an automatic bag sealing mechanism 600 configured to automatically seal the debris collection tube 304. The automatic bag sealing mechanism 600 may activate automatically based on one or more predetermined criteria or may be controlled manually by the user such as via a remote control. The debris collection tube 304 may be sealed by heat sealing, by twisting, cutting and taping, or the like. The automatic bag sealing mechanism 600 may include a plurality of linear actuators and motors to cut, seal, and secure a bag of debris from the debris collection tube 304 once a desired capacity is reached, and unload the bag of debris onto the ground. Once the bag of debris is deposited onto the ground, the automatic bag sealing mechanism 600 is reset allowing the user to continue using the system 100 without the need to stop and manually empty debris from the system.

It should further be appreciated that system 100 may be configured for use in a variety of applications where debris disposal is required. For example, system 100 may be adapted for use with a conventional household trash can or other waste receptacle for more efficient disposal of garbage. The core functionality of the improved efficiency and effectiveness of debris disposal is shared among the various applications. However, certain uses of system 100 may require various components or adapters to facilitate a particular application. It should be noted that these variations and specific applications are considered to fall within the scope of the present disclosure.

The particular embodiments disclosed herein are illustrative only, as the embodiments may be modified and practiced in different but equivalent manners apparent to those skilled in the art having the benefit of the present disclosure. It is therefore evident that the particular embodiments disclosed herein may be altered or modified, and any such variations are considered to fall within the scope of the present application. Accordingly, the protection sought herein is as set forth in the description and the appended claims as well as any other variations and modifications falling within the scope thereof.

What is claimed is:

1. A combination collection and bagging disposal system, comprising:

an intake hose configured to connect to a lawn mower and having a first end and a second end;

an output adapter connecting the intake hose to the lawn mower at the first end of the intake hose;

a collector housing unit having an upper portion and a lower portion, the collector housing unit connected to the second end of the intake hose, wherein the upper portion includes an airflow screen configured to allow air to flow through the collector housing unit while retaining landscape debris;

a flexible debris collection tube connected to the lower portion of the collector housing unit and configured to expand as debris is collected;

an inner debris collection tube support member disposed within the lower portion of the collector housing unit;

an outer debris collection tube support member connected to the system and configured to support the flexible debris collection tube as it expands; and a latch configured to compress the inner debris collection tube support member and the outer debris collection tube support member together thereby compressing the flexible debris collection tube between the inner debris collection tube support member and the outer debris collection tube support member.

2. The combination collection and bagging disposal system of claim 1, wherein the inner debris collection tube support member is bottomless allowing debris to pass through and be deposited into the debris collection tube.

3. The combination collection and bagging disposal system of claim 1, wherein the lawn mower is a conventional push mower.

4. The combination collection and bagging disposal system of claim 1, wherein the lawn mower is a riding mower.

5. The combination collection and bagging disposal system of claim 1, further comprising an air amplifier connected to the intake hose via an air amplifier intake and configured to provide additional air flow to the system.

6. The combination collection and bagging disposal system of claim 1, further comprising an automatic bag sealing mechanism including a plurality of linear actuators and motors configured to cut, seal, and secure a portion of the flexible debris collection tube and to unload the portion onto the ground, the automatic bag sealing mechanism being activateable automatically based on one or more predetermined criteria.

7. The combination collection and bagging disposal system of claim 6, wherein the flexible debris collection tube comprises a biodegradable plastic material configured to be sealed by heat by the automatic bag sealing mechanism.

8. The combination collection and bagging disposal system of claim 6, wherein the automatic bag sealing mechanism is configured to reset after unloading to enable continued operation without manual emptying.

9. A method of collecting and bagging debris, the method comprising:

providing the combination collection and bagging disposal system of claim 1;

connecting the combination collection and bagging disposal system to a lawn mower;

collecting debris in the flexible debris collection tube until a desired capacity is reached;

preparing a portion of the flexible debris collection tube for disposal by cutting and sealing the portion; and depositing the portion of the flexible debris collection tube onto the ground for disposal.

10. The method of collecting and bagging debris of claim 9, wherein the step of preparing a portion of the flexible debris collection tube is performed by an automatic bag sealing mechanism including a plurality of linear actuators and motors and is activated automatically based on one or more predetermined criteria.

11. The method of collecting and bagging debris of claim 9, wherein the step of preparing a portion of the flexible debris collection tube is performed by an automatic bag sealing mechanism including a plurality of linear actuators and motors and is activated automatically in response to a user input.

* * * * *